Patented Dec. 13, 1949

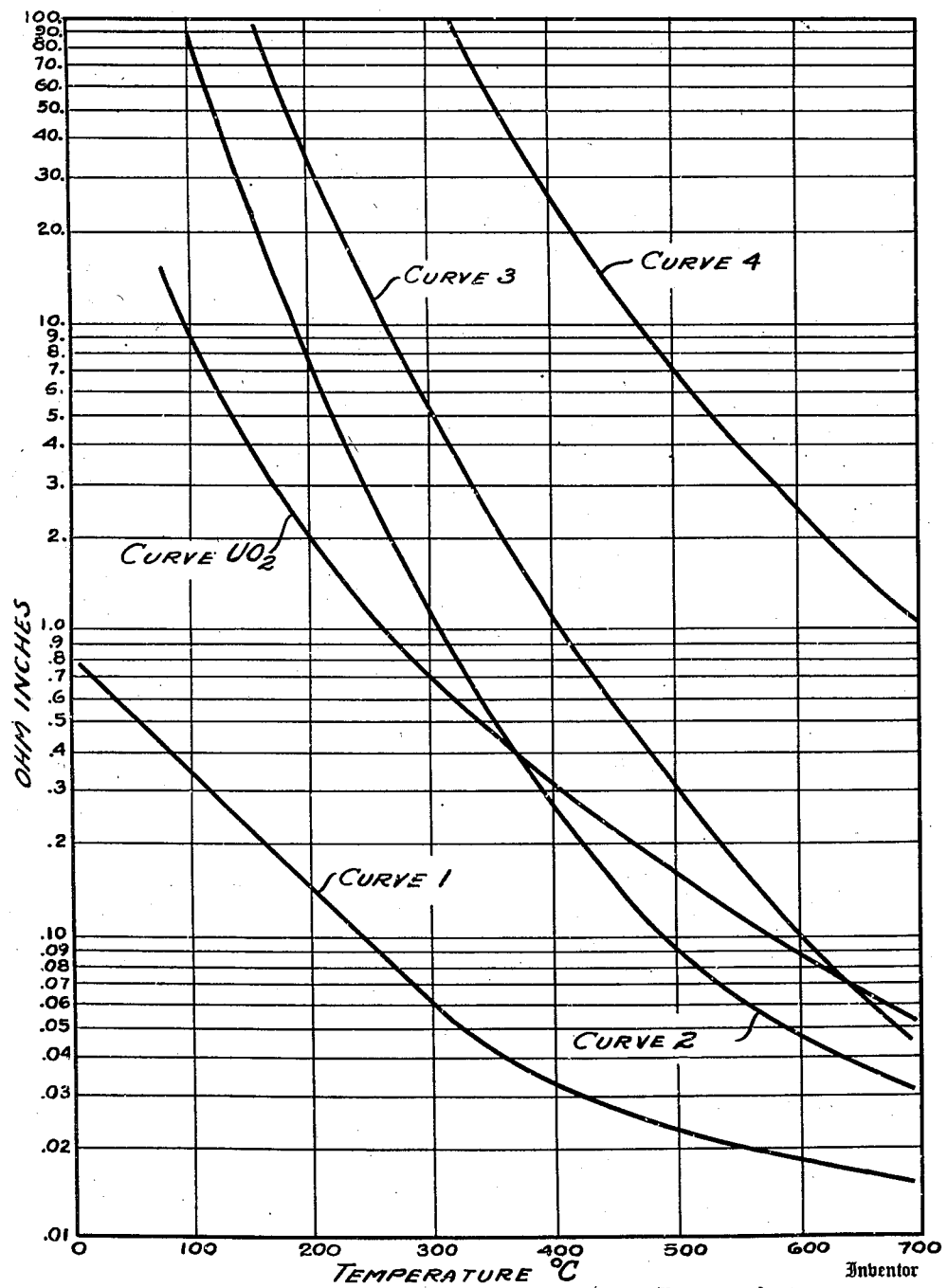

2,490,825

UNITED STATES PATENT OFFICE 2,490,825

ELECTRICALLY CONDUCTING REFRACTORY COMPOSITIONS

John M. Mochel, Corning, N. Y., assignor to Corning Glass Works, Corning, N. Y., a corporation of New York Application February 1, 1946, Serial No. 644,956

7 Claims. (Cl. 106—55)

This invention relates to electrically conducting refractory bodies and has for its primary object to provide a ceramic refractory composition which is inert to the corrosive action of molten glass and is a good conductor of electricity, not only at glass melting temperatures but also at temperatures in the neighborhood of 500° C. and less.

Another object is to provide a ceramic refractory electrode for use in the electrical melting of glass where one part of the electrode is immersed in the molten glass and another part is outside of the furnace and is exposed to a much lower temperature than the other.

Still another object is to provide ceramic refractory bodies having very low electrical resistivities.

A further object is to provide a simple method for modifying or lowering the electrical resistance of known ceramic refractory bodies.

Another object is to provide electrical resistivity modifiers which lower the resistivity of refractory stannic oxide compositions.

In Patent 2,244,777 it is shown that stannic oxide, when molded and fired, forms refractory bodies which are exceedingly resistant to the corrosive and erosive action of molten glass. The patent shows further that the slow and persistent firing shrinkage of such bodies can be accelerated and substantially total shrinkage can be obtained in a single firing operation if the stannic oxide contains 0.5% to 2% of a shrinking or mineralizing agent comprising an oxide of copper, silver, gold, manganese, iron, cobalt or nickel.

In my pending application Serial Number 564,689 filed November 22, 1944, now Patent No. 2,467,144, I have shown that the prior stannic oxide refractory bodies, and particularly those containing a shrinking agent, have a substantial electrical conductivity at 1200° C. or above, and that the introduction of a small percentage of uranium oxide or equivalent uranium compound into the stannic oxide body lowers its electrical resistance to such an extent that the body can be employed as an electrode in direct contact with molten glass. In the electrical melting of glass by means of electrodes immersed therein, one end of the electrode is subjected to the glass melting temperature (1200°–1500° C.), but the other end must be connected to an external source of electric current and its temperature may be as low as 500° C. or less. The uranium-containing stannic oxide bodies at best have electrical resistivities which are about ten times greater at 500° C. than they are at 1200° C. and which are about forty times greater at 300° C. than at 1200° C.

I have now found that certain elements of the fifth periodic group consisting of arsenic, antimony, tantalum and bismuth, when introduced into the prior stannic oxide refractory bodies, lower the electrical resistivity of such bodies at high temperature in manner similar to the effect of uranium. I have further found that antimony is more effective than uranium at the lower temperatures, the resistivity of the antimony-containing body being about one-seventh as great at 500° C. and about one-twelfth as great at 300° C. as the uranium-containing body. Insofar as it has been possible to determine, the other elements of the fifth periodic group, columbium, vanadium, phosphorus and nitrogen are ineffective. In fact, some elements of other periodic groups, such as iron and aluminum, have a poisoning effect and cause an increase in the electrical resistivity of stannic oxide bodies when added thereto.

The effective elements or resistivity modifiers, arsenic, antimony, tantalum and bismuth may be introduced as their oxides or other equivalent compounds. However, it is essential that the stannic oxide body contain a shrinking agent which is capable of bringing about practically complete shrinkage of the body in a single firing. As shown in the Patent 2,244,777 above referred to, such shrinking agents comprise compounds of copper, silver, gold, manganese, iron, cobalt and nickel. In my pending application, mentioned above, I have shown that zinc compounds also act as shrinking agents in stannic oxide bodies if the bodies are fired at temperatures about 100° C. higher than those required for the prior shrinking agents. Without the presence of such a shrinking agent in the body, the new resistivity modifiers, arsenic, antimony, tantalum and bismuth are less effective than uranium is in the absence of a shrinking agent. Particularly good results, that is, lower electrical resistivities, are obtained with the new resistivity modifiers when copper is used as the shrinking agent, which may be due to their interaction or co-reaction therewith.

Relatively small amounts of the resistivity modifier, arsenic, antimony, tantalum or bismuth, are required to produce an effective lowering of the electrical resistivity of the stannic oxide body and, although best results are obtained when the amount is at least .5% of the total composition, some effect is produced by still smaller amounts provided the amount of shrinking agent is sufficient to cause substantially complete shrinkage of the body on firing. Amounts as high as 5% or more of the new resistivity modifiers may be used, but optimum results are usually obtained with less than 5%. For example, antimony, which as stated above is the most effective of the fifth group elements, produces optimum results when the composition consists of the following parts by weight: 100 $SnO_2$, .5 CuO, and 1 $Sb_2O_3$.

The new stannic oxide bodies, like those described in Patent 2,244,777, may be molded in known manner either by ramming or pressing a plastic batch in a mold or by forming a slip and casting it in the usual manner. If the shrinking agent or the resistivity modifier is soluble, it is advantageous in slip casting to introduce it into the shaped and partially sintered body by soaking the porous body in the solution, drying and firing it. However, it is preferable to employ as shrinking agent and resistivity modifier oxides or compounds which are insoluble and to add them to the stannic oxide in a finely powdered form before forming the slip. For example, arsenic trioxide, $As_2O_3$, is sufficiently soluble to flocculate the stannic oxide slip, hence I have found it advantageous to use cupric arsenite whereby a satisfactory slip can be produced and successfully cast.

In order to prevent the formation of drying cracks prior to sintering or firing the body and to minimize firing shrinkage, it is preferable to employ in the batch upwards of 50% or more of a grog which is prepared by prefiring a portion of the batch and grinding it to the desired fineness.

From the standpoint of both conductivity and refractoriness, it is preferable to fire the body in an oxidizing or non-reducing atmosphere. Bodies fired oxidizingly have a lower electrical resistivity and better refractory qualities than bodies which are fired under reducing conditions. Firing temperatures should preferably be in the neighborhood of 1350°–1450° C.

As examples illustrating the invention, the following compositions in parts by weight are given:

|  | 1 | 2 | 3 | 4 |
| --- | --- | --- | --- | --- |
| Stannic oxide | 100 | 100 | 100 | 100 |
| Cupric oxide | 0.5 | 0.5 | 1.0 | 2.0 |
| Antimony trioxide | 1.0 |  |  |  |
| Cupric arsenite |  | 1.5 |  |  |
| Bismuth trioxide |  |  | 2.0 |  |
| Tantalum pentoxide |  |  |  | 4.0 |

To illustrate the effectiveness of the new resistivity modifiers and the low electrical resistivities of the new refractory bodies reference is had to the accompanying drawings which is a graph showing a series of curves representing the change in electrical resistivity with change in temperature for the compositions which are given in the above table. The numbers designating the curves are the numbers of the respective corresponding compositions in the above table. For comparison, the curve designated $UO_2$ is given which illustrates the comparative effectiveness of uranium at its best according to my pending application above referred to and representing the electrical resistivity versus temperature for a composition consisting of 96% $SnO_2$, 2% CuO and 2% $UO_2$.

The rate of change in electrical resistivity is relatively large and hence these values are plotted on a logarithmic scale for the better presentation of the data.

Referring to the drawing, it will be noted that the electrical resistivities at 500° C. of the stannic oxide bodies which contain antimony and arsenic (curves 1 and 2) are substantially lower than that of the body containing uranium (curve $UO_2$). The resistivity at 500° C. of the body containing bismuth (curve 3) is only slightly higher than that represented by the curve $UO_2$ and the resistivity of the body containing tantalum (curve 4) is 7 ohm inches at 500° C. In comparison with this the resistivity of a stannic oxide body containing only a shrinking agent comprising CuO is in the neighborhood of 1000 ohm inches at 500° C.

Other highly refractory and corrosion resistant oxides or silicates may be employed in the new refractory bodies in substantial amounts as diluents for the stannic oxide, provided that such oxides do not nullify or poison the effect of the arsenic, antimony, tantalum or bismuth oxides. For example, I have found that zircon has no poisoning effect on the new refractory bodies and may be introduced into the bodies in amounts up to 40% or more by weight without objectionably increasing their resistivities. Since zircon is highly corrosion resistant and is less expensive than stannic oxide, this is advantageous for some purposes such as for baffles or bridgewalls in electric melting tanks.

I claim:

1. As a new article of manufacture a sintered refractory body characterized by a decrease in electrical resistance with an increase in temperature and comprising 93% to 99% $SnO_2$, 0.5% to 2% of an oxide selected from the group consisting of oxides of nickel, cobalt, iron, manganese, copper, silver, gold and zinc, and 0.5% to 5% of an oxide selected from the group consisting of $As_2O_3$, $Sb_2O_3$, $Ta_2O_5$ and $Bi_2O_3$.

2. As a new article of manufacture a sintered refractory body characterized by a decrease in electrical resistance with an increase in temperature and comprising 93% to 99% $SnO_2$, 0.5% to 2% of an oxide selected from the group consisting of oxides of nickel, cobalt, iron, manganese, copper, silver, gold and zinc, and 0.5% to 5% of $Sb_2O_3$.

3. As a new article of manufacture a sintered refractory body characterized by a decrease in electrical resistance with an increase in temperature and comprising 93% to 99% $SnO_2$, 0.5% to 2% of an oxide selected from the group consisting of oxides of nickel, cobalt, iron, manganese, copper, silver, gold and zinc, and 0.5% to 5% of $As_2O_3$.

4. As a new article of manufacture a sintered refractory body characterized by a decrease in electrical resistance with an increase in temperature and comprising 93% to 99% $SnO_2$, 0.5% to 2% of an oxide selected from the group consisting of oxides of nickel, cobalt, iron, manganese, copper, silver, gold and zinc, and 0.5% to 5% of $Bi_2O_3$.

5. As a new article of manufacture a sintered refractory body characterized by a decrease in electrical resistance with an increase in temperature and comprising 93% to 99% $SnO_2$, 0.5% to 2% CuO and 0.5% to 5% of an oxide selected from the group consisting of $As_2O_3$, $Sb_2O_3$, $Ta_2O_5$ and $Bi_2O_3$.

6. As a new article of manufacture a sintered refractory body characterized by a decrease in electrical resistance with an increase in temperature and comprising 93% to 99% $SnO_2$, 0.5% to 2% CuO and 0.5% to 5% $Sb_2O_3$.

7. As a new article of manufacture a refractory body characterized by a decrease in electrical resistance with an increase in temperature and comprising a sintered mixture consisting of stannic oxide containing 0.5% to 2% CuO and 0.5% to 5% $Sb_2O_3$.

JOHN M. MOCHEL.

REFERENCES CITED

The following references are of record in the file of this patent:

UNITED STATES PATENTS

| Number | Name | Date |
| --- | --- | --- |
| 1,502,421 | Cooper | July 22, 1924 |
| 1,517,618 | Cooper | Dec. 2, 1924 |